United States Patent
Woo et al.

(10) Patent No.: US 11,145,889 B2
(45) Date of Patent: Oct. 12, 2021

(54) LITHIUM METAL SECONDARY BATTERY AND BATTERY MODULE INCLUDING THE SAME

(71) Applicant: LG CHEM, LTD., Seoul (KR)

(72) Inventors: Kyung-Hwa Woo, Daejeon (KR); Hyun-Woong Yun, Daejeon (KR); Jeong-In Yu, Daejeon (KR); Jong-Keon Yoon, Daejeon (KR)

(73) Assignee: LG Chem, Ltd., Seoul (KR)

( * ) Notice: Subject to any disclaimer, the term of this patent is extended or adjusted under 35 U.S.C. 154(b) by 247 days.

(21) Appl. No.: 16/376,441

(22) Filed: Apr. 5, 2019

(65) Prior Publication Data

US 2019/0341647 A1 Nov. 7, 2019

(30) Foreign Application Priority Data

Feb. 7, 2018 (KR) .................. 10-2018-0015293

(51) Int. Cl.
*H01M 10/00* (2006.01)
*H01M 10/052* (2010.01)
(Continued)

(52) U.S. Cl.
CPC ......... *H01M 10/052* (2013.01); *H01M 4/382* (2013.01); *H01M 10/44* (2013.01); *H01M 50/20* (2021.01)

(58) Field of Classification Search
CPC ............... H01M 10/052; H01M 10/44; H01M 10/0468; H01M 50/20; H01M 50/116; H01M 4/382; H01M 4/134; Y02E 60/10
See application file for complete search history.

(56) References Cited

U.S. PATENT DOCUMENTS 5,853,914 A 12/1998 Kawakami
6,007,935 A * 12/1999 Gauthier ............... H01M 4/381
429/66

(Continued)

FOREIGN PATENT DOCUMENTS

JP 3184071 B2 7/2001
JP 2004-213902 A 7/2004

(Continued)

OTHER PUBLICATIONS

Extended European Search Report issued from the European Patent Office dated Nov. 5, 2020 in corresponding European patent application No. 19751730.3.

*Primary Examiner* — Naum Levin
(74) *Attorney, Agent, or Firm* — Morgan, Lewis & Bockius LLP

(57) ABSTRACT

Disclosed is a lithium metal secondary battery which includes: an electrode assembly including a negative electrode, a positive electrode and a separator interposed between the negative electrode and the positive electrode; a non-aqueous electrolyte with which the electrode assembly is impregnated; and a battery casing in which the electrode assembly and the non-aqueous electrolyte are received, wherein the negative electrode includes a negative electrode current collector and a lithium metal layer formed on at least one surface of the negative electrode current collector, the charge/discharge condition of the lithium metal secondary battery includes charging the lithium metal secondary battery under a pressurized state and discharging the lithium metal secondary battery under a non-pressurized or pressurized state, and when the lithium secondary battery is discharged under a pressurized state, the pressure applied during discharge is controlled to be smaller than the pressure (Continued)

applied during charge. A battery module including the lithium metal secondary battery is also disclosed.

19 Claims, 2 Drawing Sheets

(51) Int. Cl.
    *H01M 4/38*           (2006.01)
    *H01M 10/44*         (2006.01)
    *H01M 50/20*         (2021.01)

(56) References Cited

U.S. PATENT DOCUMENTS

| | | | | |
|---|---|---|---|---|
| 6,087,036 | A * | 7/2000 | Rouillard | H01M 10/0468 |
| | | | | 429/66 |
| 6,755,873 | B2 * | 6/2004 | Mizutani | H01M 10/052 |
| | | | | 29/623.2 |
| 8,529,801 | B2 * | 9/2013 | Choi | H01M 4/386 |
| | | | | 252/519.33 |
| 9,105,938 | B2 | 8/2015 | Scordilis-Kelley et al. | |
| 9,399,404 | B2 * | 7/2016 | Ose | B60L 50/64 |
| 9,548,492 | B2 | 1/2017 | Affinito et al. | |
| 9,780,404 | B2 | 10/2017 | Scordilis-Kelley et al. | |
| 10,256,507 | B1 * | 4/2019 | Busacca | H01M 10/054 |
| 10,505,222 | B2 * | 12/2019 | Carignan | H01M 10/0565 |
| 10,629,947 | B2 * | 4/2020 | Affinito | H01M 4/382 |
| 10,680,277 | B2 * | 6/2020 | Snyder | H01M 10/0562 |
| 10,680,283 | B2 * | 6/2020 | Leblanc | H01M 10/0565 |
| 2007/0259271 | A1 * | 11/2007 | Nanno | H01M 2/0267 |
| | | | | 429/318 |
| 2008/0052900 | A1 | 3/2008 | Kondo et al. | |
| 2010/0035128 | A1 | 2/2010 | Scordilis-Kelley et al. | |
| 2013/0260205 | A1 | 10/2013 | Kwon et al. | |
| 2014/0234730 | A1 | 8/2014 | Albertus et al. | |
| 2015/0134172 | A1 * | 5/2015 | Ose | B60L 58/10 |
| | | | | 701/22 |
| 2015/0171398 | A1 * | 6/2015 | Roumi | H01M 10/4257 |
| | | | | 429/7 |
| 2015/0180000 | A1 | 6/2015 | Roumi | |
| 2015/0236373 | A1 | 8/2015 | Ohtomo et al. | |
| 2017/0133705 | A1 | 5/2017 | Niwa et al. | |
| 2017/0301951 | A1 | 10/2017 | Carignan et al. | |
| 2019/0245178 | A1 * | 8/2019 | Cao | H01M 10/0562 |
| 2019/0341584 | A1 * | 11/2019 | Schreiber | H01M 2/0272 |
| 2019/0372150 | A1 * | 12/2019 | Busacca | H01M 10/0525 |
| 2020/0020990 | A1 * | 1/2020 | Oba | H01M 10/42 |

FOREIGN PATENT DOCUMENTS

| | | |
|---|---|---|
| JP | 2005-032632 A | 2/2005 |
| JP | 2008-059954 A | 3/2008 |
| JP | 2011-530784 A | 12/2011 |
| JP | 2015-95281 A | 5/2015 |
| JP | 2016-081790 A | 5/2016 |
| JP | 2016-110777 A | 6/2016 |
| JP | 2018-116914 A | 7/2018 |
| KR | 2013-0112310 A | 10/2013 |
| KR | 10-2013-0126365 A | 11/2013 |
| KR | 10-2015-0098573 A | 8/2015 |
| KR | 10-2016-0121817 A | 10/2016 |
| KR | 2016-0132572 A | 11/2016 |
| KR | 10-2017-0096352 A | 8/2017 |
| WO | 2015/141631 A1 | 9/2015 |
| WO | 2017/077055 A1 | 5/2017 |

* cited by examiner

LITHIUM METAL SECONDARY BATTERY AND BATTERY MODULE INCLUDING THE SAME

TECHNICAL FIELD

The present disclosure relates to a lithium metal secondary battery and a battery module including the same. More particularly, the present disclosure relates to a lithium metal secondary battery having improved cycle characteristics and a battery module including the same.

The present application claims priority to Korean Patent Application No. 10-2018-0015293 filed on Feb. 7, 2018 in the Republic of Korea, the disclosures of which including the specification and drawings are incorporated herein by reference.

BACKGROUND ART

As electric, electronic, communication and computer industries have been developed rapidly, high-capacity batteries have been in increasingly in demand. To meet such demand, a lithium metal secondary battery using lithium metal or lithium alloy as a negative electrode having high energy density has been given many attentions.

A lithium metal secondary battery refers to a secondary battery using lithium metal or a lithium alloy as a negative electrode. Lithium metal has a low density of 0.54 g/cm$^3$ and a significantly low standard reduction potential of −3.045V (SHE: based on the standard hydrogen electrode), and thus has been most spotlighted as an electrode material for a high-energy density battery.

Such a lithium metal secondary battery has not been commercialized due to its poor cycle characteristics. This is because dendritic plating of lithium occurs during charge to cause an increase in surface area of an electrode and side reactions with an electrolyte.

Therefore, there is a need for a method for preventing dendritic plating of lithium physically.

DISCLOSURE

Technical Problem

The present disclosure is directed to providing a lithium metal secondary battery which can provide improved cycle characteristics by applying a predetermined pressure during charge to prevent dendritic plating of lithium physically, and a battery module including the same.

Technical Solution

In one aspect of the present disclosure, there is provided a lithium metal secondary battery according to any one of the following embodiments.

According to the first embodiment, there is provided a lithium metal secondary battery which includes:

an electrode assembly including a negative electrode, a positive electrode and a separator interposed between the negative electrode and the positive electrode;

a non-aqueous electrolyte with which the electrode assembly is impregnated; and a battery casing in which the electrode assembly and the non-aqueous electrolyte are received, wherein the negative electrode includes a negative electrode current collector and a lithium metal layer formed on at least one surface of the negative electrode current collector, the charge/discharge condition of the lithium metal secondary battery includes charging the lithium metal secondary battery under a pressurized state and discharging the lithium metal secondary battery under a non-pressurized or pressurized state, and when the lithium secondary battery is discharged under a pressurized state, the pressure applied during discharge is controlled to be smaller than the pressure applied during charge.

According to the second embodiment, there is provided the lithium metal secondary battery according to the first embodiment, wherein the pressure applied during charge is 3-150 psi.

According to the third embodiment, there is provided the lithium metal secondary battery according to the first or the second embodiment, wherein the pressure applied during charge is 40-100 psi.

According to the fourth embodiment, there is provided the lithium metal secondary battery according to the first to the third embodiments, wherein the pressure applied during discharge is 1-10 psi, when the lithium metal secondary battery is discharged under a pressurized state.

According to the fifth embodiment, there is provided the lithium metal secondary battery according to the first to the fourth embodiments, wherein the current density during charge is 0.01-4 mA/cm$^2$.

According to the sixth embodiment, there is provided the lithium metal secondary battery according to the first to the fifth embodiments, wherein the current density during charge is 0.05-3.5 mA/cm$^2$.

According to the seventh embodiment, there is provided the lithium metal secondary battery according to the first to the sixth embodiments, wherein the temperature during charge is 25-45° C.

According to the eighth embodiment, there is provided the lithium metal secondary battery according to the first to the seventh embodiments, which is charged at a temperature of 25-45° C. under a pressure of 40-100 psi with a charging current density of 0.05-3.5 mA/cm$^2$, and is discharged under a non-pressurized state or under a pressure of 1-10 psi.

According to the ninth embodiment, there is provided the lithium metal secondary battery according to the first to the eighth embodiments, which is a pouch-type lithium metal secondary battery.

In another aspect of the present disclosure, there is provided a battery module according to any one of the following embodiments.

According to the tenth embodiment, there is provided a battery module including a plurality of unit cells and a module casing for receiving the unit cells, wherein the unit cell is the lithium metal secondary battery as defined in any one of the first to the ninth embodiments.

According to the eleventh embodiment, there is provided the battery module as defined in the tenth embodiment, wherein the lithium metal secondary battery is a pouch-type lithium metal secondary battery.

According to the twelfth embodiment, there is provided the battery module as defined in the tenth or the eleventh embodiment, wherein the module casing includes a rubber material.

According to the thirteenth embodiment, there is provided the battery module as defined in any one of the tenth to the twelfth embodiments, wherein a portion of the module casing that is in contact with the large-area surface of the unit cell includes a rubber material.

In still another aspect, there is provided the battery pack according to the following embodiment.

According to the fourteenth embodiment, there is provided a battery pack including the battery module as defined in the tenth embodiment.

Advantageous Effects

According to the present disclosure, the lithium metal secondary battery is charged under a pressurized state and discharged under a non-pressurized state or pressurized state. Thus, it is possible to physically prevent dendritic plating of lithium occurring during charge, and thus to improve cycle characteristics of the battery.

In addition, pressure is applied merely during charge and pressure may not be applied or a predetermined level of pressure may be applied during discharge. Therefore, it is possible to provide higher efficiency as compared to charge/discharge under pressure application.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Figure 1:
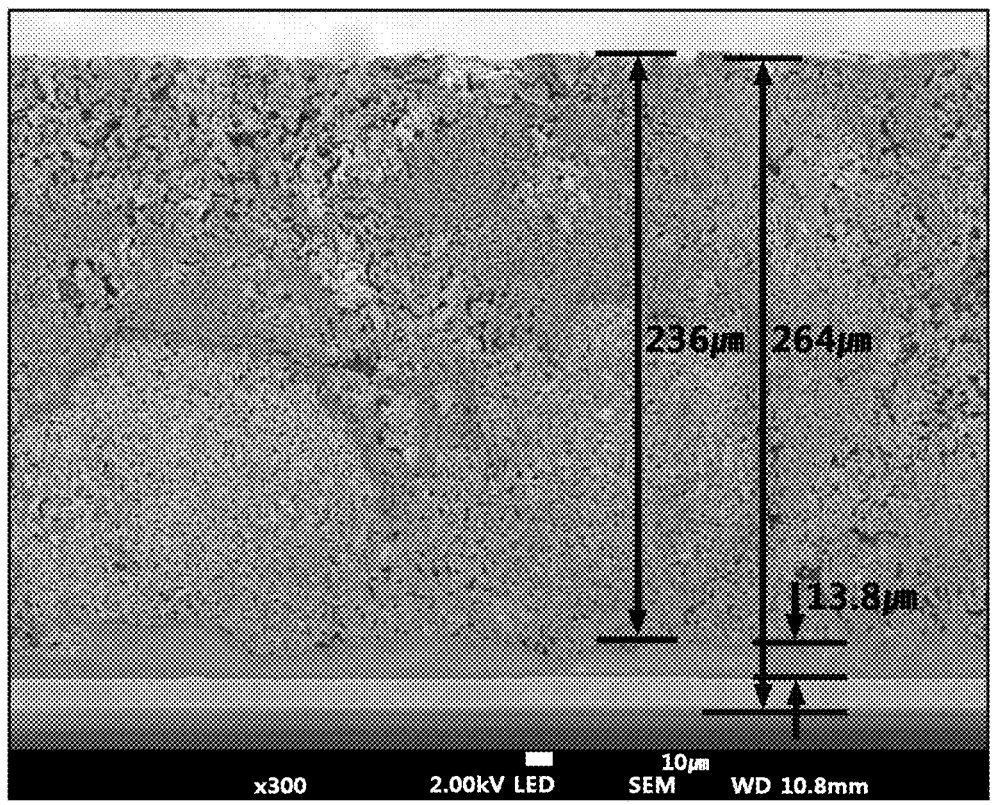
FIG. 1 is a scanning electron microscopic (SEM) image illustrating the sectional view of the negative electrode after repeating cycles in the lithium metal secondary battery according to Comparative Example 1.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

The lithium metal secondary battery according to an embodiment of the present disclosure includes: an electrode assembly including a negative electrode, a positive electrode and a separator interposed between the negative electrode and the positive electrode; a non-aqueous electrolyte with which the electrode assembly is impregnated; and a battery casing in which the electrode assembly and the non-aqueous electrolyte are received, wherein the negative electrode includes a negative electrode current collector and a lithium metal layer formed on at least one surface of the negative electrode current collector, the charge/discharge condition of the lithium metal secondary battery includes charging the lithium metal secondary battery under a pressurized state and discharging the lithium metal secondary battery under a non-pressurized or pressurized state, and when the lithium secondary battery is discharged under a pressurized state, the pressure applied during discharge is controlled to be smaller than the pressure applied during charge. In the conventional lithium metal secondary battery, dendritic plating of lithium is formed on the negative electrode surface during charge. As a result, there are problems in that charge capacity is decreased due to an increase in distance between the negative electrode and the positive electrode, or deformation occurs repeatedly due to charge/discharge to cause deterioration of internal elements and degradation of cycle life.

To improve the above-mentioned problems, the lithium metal secondary battery according to the present disclosure is subjected to a controlled charge/discharge condition so that it is charged under pressurization using a pressurization device to inhibit swelling of its appearance, and is discharged without pressurization (under a non-pressurized state) or under a pressurized state with a pressure smaller than the pressure applied during charge.

According to the present disclosure, it is possible to physically prevent dendritic plating of lithium, which may be generated during the charge of a lithium metal secondary battery, by carrying out charge under a pressurized state. It is also possible to inhibit side reactions with an electrolyte caused by an increase in surface area of an electrode due to dendritic plating of lithium, and thus to improve cycle characteristics of the battery.

Further, the lithium metal secondary battery according to the present disclosure is not subjected to pressure application at all times, but is subjected to pressure application merely during the charge of the battery and is not subjected to pressure application during the discharge of the battery. Otherwise, the lithium metal secondary battery is subjected to pressure application during charge of the battery and is also subjected to application of a predetermined range of pressure during discharge of the battery. Thus, undesired pressure is not used during discharge to provide convenience of use. Otherwise, the charge/discharge condition is controlled to apply lower pressure during discharge as compared to the pressure applied during charge. As a result, when both electrodes are spaced from each other undesirably due to a swelling phenomenon after the completion of charge cycles, it is possible to compress them to reinforce the contact between both electrodes, and thus to improve battery performance.

As used herein, 'pressurize a lithium metal secondary battery' or 'pressure is applied to a lithium metal secondary battery' means that pressure is applied in the thickness direction of the lithium metal secondary battery or to the large-area surface thereof.

According to an embodiment of the present disclosure, the pressure applied during charge of the lithium metal secondary battery may be 3-150 psi, or 40-100 psi. When the pressure applied during charge is within the above-defined range, it is possible to effectively prevent dendritic plating of lithium occurring during charge, and to avoid leakage of a non-aqueous electrolyte, an increase in cell resistance and compression of a separator, caused by excessive pressurization, thereby ensuring cell safety.

When the lithium metal secondary battery is discharged under a pressurized state, the pressure applied during discharge may be 1-10 psi, or 5-10 psi. When the pressure applied during discharge is within the above-defined range, it is possible to minimize a space between both electrodes, and thus to reduce cell resistance.

Meanwhile, pressurization to the lithium metal secondary battery may be carried out through a charger provided with a pressurization device (pressure application device).

Herein, the charger provided with a pressurization device may include a pressurization device formed integrally with a charger, or a conventional charger to which a pressurization device is linked.

According to an embodiment of the present disclosure, the charger provided with a pressurization device may include: a storage member in which a secondary battery cell is received; a pressurization member facing the storage member with the secondary battery cell interposed therebetween, and spaced apart from the storage member with a variable distance; a pressurization means configured to pressurize the secondary battery cell received in the storage member, in the thickness direction of the secondary battery cell by pushing or pulling the pressurization member toward or from the storage member; a measuring means configured to measure the pressure applied to the pressurization member and/or the distance between the storage member and the pressurization member at a predetermined time interval; a controlling unit configured to receive the values of the pressure applied to the pressurization member and the distance between the storage member and the pressurization member at a predetermined time interval, and to maintain the distance constantly or to change the distance in order to keep the pressure constant; and a charging unit configured to charge the secondary battery cell received in the storage member. Herein, the storage member, pressurization member, pressurization means, measuring means and the controlling unit form the pressurization device, wherein the charging unit may be formed integrally with the pressurization device or a conventional charger may be linked to the pressurization device.

Pressurization modes of the lithium metal secondary battery during charge/discharge thereof may be classified into a constant-pressure pressurization mode, constant-distance pressurization mode and a combined constant-pressure/constant-distance pressurization mode, depending on the pressure-controlling mode in the charger provided with the pressurization means.

In other words, in the constant-pressure pressurization mode, the pressure applied to the pressurization member is maintained constantly. In the constant-distance pressurization mode, the distance between the storage member and the pressurization member is maintained constantly. In the combined constant-pressure/constant-distance pressurization mode, the pressure and the distance are controlled simultaneously or sequentially.

For example, in the constant-distance pressurization mode, the distance between the storage member and the pressurization member is maintained constantly. Thus, as the lithium metal secondary battery is swelled during charge, higher pressure may be applied to the lithium metal secondary battery. In the constant-pressure pressurization mode, pressure fixed by the pressurization means is applied to the lithium metal secondary battery, and thus the distance between the storage member and the pressurization member may be changed during the pressurization. When using the constant-pressure pressurization mode, the optimum voltage range may be slightly higher as compared to the constant-distance pressurization mode.

According to an embodiment of the present disclosure, when the lithium metal secondary battery is discharged under a non-pressurized state, the lithium metal secondary battery may be removed from the charger after completing charge under a pressurized state with the charger provided with a pressurization means, or the pressure of the charger may be controlled to 0 psi.

According to another embodiment of the present disclosure, when the lithium metal secondary battery is discharged under a pressurized state, the pressure applied to the lithium metal secondary battery may be controlled to be lower than the pressure applied during charge, after completing charge under a pressurized state with the charger provided with a pressurization means.

The current density during charge may be 0.01-4 mA/cm$^2$, or 0.05-3.5 mA/cm$^2$. When the current density during charge is within the above-defined range, delocalization of current is reduced and lithium plating is formed evenly to prevent deterioration of the battery.

In addition, the temperature during charge is 25-45° C. When the temperature during charge is within the above-defined range, activation energy for chemical energy is satisfied to reduce resistance, and thus to improve capacity maintenance.

According to an embodiment of the present disclosure, the lithium metal secondary battery may be charged at a temperature of 25-45° C. under a pressure of 40-100 psi with a charging current density of 0.05-3.5 mA/cm$^2$, and may be discharged under a non-pressurized state or under a pressure of 1-10 psi.

In addition, the negative electrode includes a negative electrode current collector and a lithium metal layer formed on the negative electrode current collector. The lithium metal layer is a sheet-like metal and may have a width controllable depending on electrode shape to facilitate manufacture of an electrode. The lithium metal layer may have a thickness of 0-300 μm. Herein, 'lithium metal layer having a thickness of 0 μm' means that no lithium metal layer is formed on the negative electrode current collector right after the assemblage of the lithium metal secondary battery. Even when no lithium metal layer is formed on the negative electrode current collector, lithium ions are transported from the positive electrode, during charge, to produce a lithium metal layer on the surface of the negative electrode current collector. Therefore, it is possible to operate the lithium metal secondary battery.

Further, non-limiting examples of the negative electrode current collector include foil made of copper, gold, nickel, copper alloy or a combination thereof.

Meanwhile, the positive electrode may include a positive electrode current collector and a positive electrode active material layer coated on either surface or both surfaces thereof. Herein, non-limiting examples of the positive electrode current collector include foil made of aluminum, nickel or a combination thereof. The positive electrode active material contained in the positive electrode active material layer may be any one selected from the group consisting of $LiCoO_2$, $LiNiO_2$, $LiMn_2O_4$, $LiCoPO_4$, $LiFePO_4$, $LiNi_{1/3}Mn_{1/3}Co_{1/3}O_2$, $LiNi_{1-x-y-z}Co_xM1_yM2_zO_2$ (wherein each of M1 and M2 independently represents any one selected from the group consisting of Al, Ni, Co, Fe, Mn, V, Cr, Ti, W, Ta, Mg and Mo, each of x, y and z independently represents the atomic ratio of an element forming oxide, and $0 \leq x < 0.5$, $0 \leq y < 0.5$, $0 \leq z < 0.5$, and $0 < x+y+z \leq 1$), and combinations thereof.

In addition, the positive electrode active material layer may further include a conductive material to improve electrical conductivity. Herein, the conductive material is not particularly limited, as long as it is an electrically conductive material causing no chemical change in the lithium metal secondary battery. In general, carbon black, graphite, carbon fibers, carbon nanotubes, metal powder, conductive metal oxide or an organic conductive material may be used. Commercially available products of such conductive materials include acetylene black (available from Chevron Chemical Company or Gulf Oil Company), Ketjen Black EC series (available from Armak Company), Vulcan XC-72 (available from Cabot Company) and Super P (available from MMM Company). For example, acetylene black, carbon black or graphite may be used.

Further, various types of binders which serve to retain the positive electrode active material on the positive electrode current collector and to interconnect active material particles may be used. Particular examples of such binders include polyvinylidene fluoride-co-hexafluoroprpylene (PVDF-co-HFP), polyvinylidene fluoride (PVDF), polymethyl methacrylate, styrene butadiene rubber (SBR), carboxymethyl cellulose (CMC), or the like.

In addition, the separator may include a porous polymer substrate. The porous polymer substrate may be any porous polymer substrate used conventionally for a lithium secondary battery, and particular examples thereof include a polyolefin-based porous membrane or non-woven web but are not limited thereto.

Herein, particular examples of the polyolefin-based porous membrane may include those formed of polymers including polyethylene, such as high-density polyethylene, linear low-density polyethylene, low-density polyethylene and ultrahigh-molecular weight polyethylene, polypropylene, polybutylene and polypentene, alone or in combination.

In addition to the polyolefin-based non-woven web, particular examples of the non-woven web may include those formed of polymers including polyethylene terephthalate, polybutylene terephthalate, polyester, polyacetal, polyamide, polycarbonate, polyimide, polyether ether ketone, polyether sulfone, polyphenylene oxide, polyether sulfone, polyphenylene oxide, polyphenylene sulfide, polyethylene naphthalene, or the like, alone or in combination. The non-woven web structure may be a spun-bonded non-woven web including long fibers or a melt blown non-woven web.

The thickness of the porous polymer substrate is not particularly limited but may be 1-100 µm, or 5-50 µm.

In addition, the size of pores and the porosity present in the porous polymer substrate are not particularly limited. However, the pore size and porosity may be 0.001-50 µm and 10-95%, respectively.

Further, the electrolyte salt contained in the non-aqueous electrolyte that may be used in the present disclosure is a lithium salt. Any lithium salt used conventionally for an electrolyte for a lithium secondary battery may be used without particular limitation. For example, the anion of the lithium salt may be any one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, $(CF_3CF_2SO_2)_2N^-$, and combinations thereof.

Particular examples of the organic solvent that may be contained in the non-aqueous electrolyte may include those used conventionally for an electrolyte for a lithium secondary battery with no particular limitation. For example, it is possible to use ethers, esters, amides, linear carbonates or cyclic carbonates, alone or in combination.

Typical examples of the organic solvent may include carbonate compounds, such as cyclic carbonates, linear carbonates or mixtures thereof.

Particular examples of the cyclic carbonate compounds include any one selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, halides thereof, and combinations thereof. Particular examples of such halides include fluoroethylene carbonate (FEC) but are not limited thereto.

In addition, particular examples of the linear carbonate compounds include any one selected from the group consisting of dimethyl carbonate (DMC), diethyl carbonate (DEC), dipropyl carbonate, ethyl methyl carbonate (EMC), methyl propyl carbonate, ethyl propyl carbonate and combinations thereof, but are not limited thereto.

Particularly, ethylene carbonate and propylene carbonate, which are cyclic carbonates among the carbonate organic solvents, have a high dielectric constant and dissociate the lithium salt in an electrolyte well. In addition, it is possible to prepare an electrolyte having high electrical conductivity, when using such cyclic carbonates in combination with low-viscosity low-dielectric constant linear carbonates, such as dimethyl carbonate and diethyl carbonate, at an adequate ratio.

Further, among the organic solvents, particular examples of the ethers may include any one selected from the group consisting of dimethyl ether, diethyl ether, dipropyl ether, methyl ethyl ether, methyl propyl ether, ethyl propyl ether, and combinations thereof, but are not limited thereto.

Among the organic solvents, particular examples of the esters include any one selected from the group consisting of methyl acetate, ethyl acetate, propyl acetate, methyl propionate, ethyl propionate, γ-butyrolactone, γ-valerolactone, γ-caprolactone, σ-valerolactone, ε-caprolactone and combinations thereof, but are not limited thereto.

Injection of the non-aqueous electrolyte may be carried out in an adequate step during the process for manufacturing a lithium secondary battery depending on the manufacturing process of a final product and properties required for a final product. In other words, injection of the non-aqueous electrolyte may be carried out before the assemblage of a lithium secondary battery or in the final step of the assemblage of a lithium secondary battery.

The lithium secondary battery according to the present disclosure may be subjected to a lamination or stacking step of a separator with electrodes and a folding step, in addition to the conventional winding step. In addition, the battery casing may have a cylindrical, prismatic, pouch-like or coin-like shape. According to an embodiment of the present disclosure, the lithium metal secondary battery may be a cylindrical-type lithium metal secondary battery, a prismatic-type lithium metal secondary battery, a pouch-type lithium metal secondary battery or a coin-type lithium metal secondary battery, particularly a pouch-type lithium metal secondary battery.

Meanwhile, the battery module according to the present disclosure includes a plurality of unit cells and a module casing in which the unit cells are received, wherein the unit cell is the above-defined lithium metal secondary battery.

According to an embodiment of the present disclosure, the battery module may include two or more pouch-type unit cells and a module casing in which the pouch-type unit cells are received, wherein the module casing may include a rubber material.

The pouch-type lithium metal secondary battery according to the present disclosure undergoes an increase in volume during charge and a decrease in volume during discharge. Pressurization during charge can prevent a significant increase in volume according to the present disclosure. However, such an increase in volume cannot be prevented perfectly. In addition, a decrease in volume during discharge is inevitable.

According to the present disclosure, the module casing may include a rubber material in order to alleviate an increase/decrease in volume during charge/discharge of the unit cells.

Herein, the module casing may totally include a rubber material, or only a portion that is in contact with the large-area surface of the unit cell may include a rubber material.

Meanwhile, in still another aspect, there is provided a battery pack including the battery module and a device including the battery pack as a power source.

Herein, particular examples of the device may include, but are not limited to: power tools driven by an electric motor; electric cars, including electric vehicles (EV), hybrid electric vehicles (HEV), plug-in hybrid electric vehicles (PHEV), or the like; electric carts, including electric bikes (E-bike) and electric scooters (E-scooter); electric golf carts; electric power storage systems; or the like.

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

1. Manufacture of Lithium Metal Secondary Battery (1) Manufacture of Positive Electrode First, 95 parts by weight of $LiNi_{1/3}Mn_{1/3}Co_{1/3}O_2$ as a positive electrode active material, 2.5 parts by weight of Super P as a conductive material, and 2.5 parts by weight of polyvinylidene fluoride (PVDF) as a binder were added to N-methyl-2-pyrrolidone (NMP) as a solvent to prepare positive electrode active material slurry. Next, the positive electrode active material slurry was coated on one surface of an aluminum current collector to a thickness of 65 μm, followed by drying, pressing and punching into a predetermined size, thereby providing a positive electrode.

(2) Manufacture of Negative Electrode

Lithium metal foil having a thickness of 20 μm was attached to one surface of a copper current collector having a thickness of 10 μm to obtain a negative electrode.

(3) Manufacture of Lithium Metal Secondary Battery

A separator (polyethylene-based porous polymer substrate having porous coating layers containing a mixture of alumina with PVDF binder on both surfaces thereof) was interposed between the positive electrode and the negative electrode to form an electrode assembly. Next, the electrode assembly was inserted to a pouch-type battery casing. Then, an electrolyte including 1 wt % of vinylene carbonate (VC) as an additive and 1M $LiPF_6$ dissolved in a solvent containing fluoroethylene carbonate (FEC) mixed with ethyl methyl carbonate (EMC) at a volume ratio of 30:70 was injected to the battery casing. After that, the battery casing was sealed completely to obtain a lithium metal secondary battery.

2. Determination of Capacity Maintenance of Lithium Metal Secondary Battery

The lithium metal secondary battery was charged to 4.25V under a constant-current/constant-voltage (CC/CV) condition and discharged (discharge temperature 25° C.) to 3V under a constant-current (CC) condition with a current density of 2 mA/cm$^2$, while varying the pressurization condition during charge/discharge as shown in the following Table 1. The above-mentioned charge/discharge cycles were repeated 50 times. The capacity maintenance after 50 cycles is shown in Table 1.

Herein, the lithium metal secondary battery was charged/discharged by using a charger to which a constant-pressure pressurization device is linked.

Particularly, a pressurization device was prepared. The pressurization device includes: a storage member in which a secondary battery cell is received; a pressurization member facing the storage member with the secondary cell interposed therebetween, and spaced apart from the storage member with a variable distance; a pressurization means configured to pressurize the secondary battery cell received in the storage member, in the thickness direction of the secondary battery cell by pushing or pulling the pressurization member toward or from the storage member; a measuring means configured to measure the pressure applied to the pressurization member and/or the distance between the storage member and the pressurization member at a predetermined time interval; and a controlling unit configured to receive the values of the pressure applied to the pressurization member and the distance between the storage member and the pressurization member at a predetermined time interval, and to maintain the distance constantly or to change the distance in order to keep the pressure constant. The lithium metal secondary battery was mounted to the pressurization device. Then, the lithium metal secondary battery was connected to a charger (PNE Solution Co., PESC05), and charge/discharge was carried out under the condition as shown in Table 1. Herein, the pressure applied to the lithium secondary battery during charge/discharge was controlled through the pressurization device. In Table 1, the pressurization condition during charge means the pressure (pressurization force) applied to the lithium metal secondary battery during charge, and the pressurization condition during discharge means the pressure (pressurization force) applied to the lithium metal secondary battery during discharge.

TABLE 1

| | Charge/Discharge Condition | | | | |
|---|---|---|---|---|---|
| | Pressurization condition during charge (psi) | Pressurization condition during discharge (psi) | Temperature during charge (° C.) | Current density during charge (mA/cm$^2$) | Capacity maintenance after 50 cycles (%) |
| Ex. 1 | 3 | 0 | 25 | 0.4 | 20 |
| Ex. 2 | | | | 2 | 15 |
| Ex. 3 | | | 45 | 0.4 | 22 |
| Ex. 4 | | | | 2 | 21 |
| Ex. 5 | 10 | | 25 | 0.4 | 40 |
| Ex. 6 | | | | 2 | 30 |
| Ex. 7 | | | 45 | 0.4 | 50 |
| Ex. 8 | | | | 2 | 40 |

TABLE 1-continued

| | Charge/Discharge Condition | | | | |
|---|---|---|---|---|---|
| | Pressurization condition during charge (psi) | Pressurization condition during discharge (psi) | Temperature during charge (° C.) | Current density during charge (mA/cm$^2$) | Capacity maintenance after 50 cycles (%) |
| Ex. 9 | 40 | | 25 | 0.4 | 77 |
| Ex. 10 | | | | 2 | 75 |
| Ex. 11 | | | 45 | 0.4 | 80 |
| Ex. 12 | | | | 2 | 78 |
| Ex. 13 | 40 | | 25 | 0.05 | 80 |
| Ex. 14 | | | | 0.1 | 78 |
| Ex. 15 | | | | 0.4 | 80 |
| Ex. 16 | | | | 3 | 70 |
| Ex. 17 | | | | 3.5 | 64 |
| Ex. 18 | | 5 | | 2 | 79 |
| Ex. 19 | | 10 | | 2 | 78 |
| Ex. 20 | 100 | 0 | 25 | 0.4 | 79 |
| Ex. 21 | | | | 2 | 76 |
| Ex. 22 | | | 45 | 0.4 | 81 |
| Ex. 23 | | | | 2 | 80 |
| Ex. 24 | 150 | | 25 | 0.4 | 45 |
| Ex. 25 | | | | 2 | 33 |
| Ex. 26 | | | 45 | 0.4 | 57 |
| Ex. 27 | | | | 2 | 47 |
| Comp. Ex. 1 | 0 | | 25 | 0.4 | 0 |
| Comp. Ex. 2 | | | | 2 | 0 |
| Comp. Ex. 3 | | | 45 | 0.4 | 0 |
| Comp. Ex. 4 | | | | 2 | 0 |

As shown in Table 1, Comparative Examples 1-4, wherein no pressurization is applied during charge of the lithium metal secondary battery, provide a capacity maintenance of 0 after 50 cycles, while Examples, wherein pressurization is applied during charge, show a capacity maintenance of at least 15%.

Particularly, Examples 9-23, wherein pressurization is applied during charge with a pressure of 40 psi and 100 psi, show a high capacity maintenance of at least 64%.

In addition, after comparing Example 10, Example 18 and Example 19, wherein charge/discharge is carried out under the same pressurization condition, temperature and current density during charge, and the different pressurization condition of 0, 5 and 10 psi during discharge, it can be seen that they show an equivalent capacity maintenance of 75-79%. This suggests that when the lithium metal secondary battery according to the present disclosure satisfies the pressurization condition during charge, it is possible to provide improved cycle characteristics by preventing dendritic plating of lithium physically, even though discharge is carried out without pressurization (in a non-pressurized state) or under application of a pressure lower than the pressure applied during charge.

In addition, under the same pressurization condition during charge, a higher capacity maintenance is provided at a higher temperature. Referring to Examples 13-17, it can be seen that capacity maintenance is further improved, when the current density during charge is relatively low within a range of 0.05-2 mA/cm$^2$, under the same pressurization condition and temperature during charge. In other words, when the temperature is higher, activation energy for chemical reaction is satisfied and chemical reaction is accelerated to reduce resistance and to provide slightly increased capacity maintenance. As the current density is decreased, delocalization of electric current is reduced and lithium plating is formed evenly to prevent deterioration of the battery.

Figure 2:
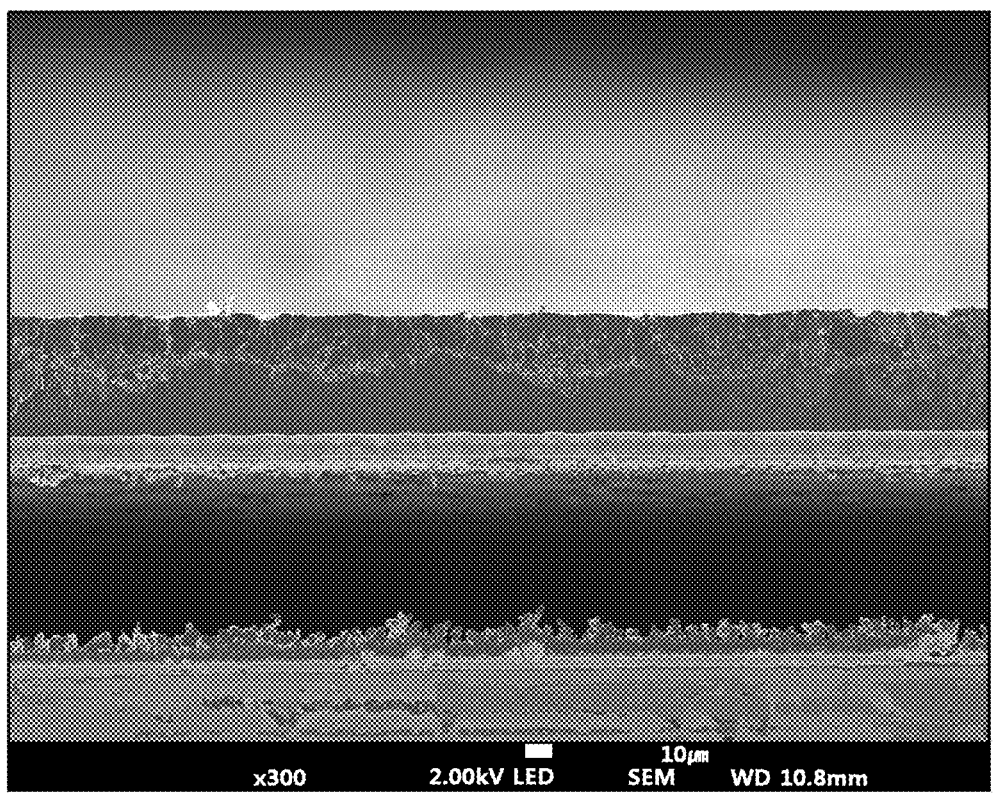
FIG. 2 is an SEM image illustrating the sectional view of the negative electrode after repeating cycles in the lithium metal secondary battery according to Example 5.

FIG. 1 is a scanning electron microscopic (SEM) image illustrating the sectional view of the negative electrode after repeating 10 cycles in the lithium metal secondary battery according to Comparative Example 1. FIG. 2 is an SEM image illustrating the sectional view of the negative electrode after repeating 10 cycles in the lithium metal secondary battery according to Example 5.

Referring to FIG. 1, in the case of Comparative Example 1, lithium metal grows like dendrite to form pores. In addition, copper foil having a thickness of 13 μm, lithium metal having a thickness of 13.8 μm and dendrite having a thickness of 236 μm are observed, when viewed from the bottom. On the contrary, in FIG. 2 illustrating the negative electrode according to Example 5, it can be seen that the dendrite layer has a smaller thickness, no pores are formed, and the lithium metal layer has a larger thickness. Thus, it can be seen that the lithium metal secondary battery according to the present disclosure can prevent dendritic plating of lithium physically by carrying out charge under a pressurized condition and discharge under a non-pressurized state or pressurized state.

It should be understood that the detailed description are given by way of illustration only and various changes and modifications may be made without departing from the scope of the invention as defined in the following claims. Therefore, the embodiments disclosed herein are not intended to limit the scope of the present disclosure but are for illustrative purposes only, and the scope of the present disclosure is not limited thereto. It should be also understood that the scope of the present disclosure is defined by the following claims and all equivalents thereof are also included in the scope of the present disclosure.

What is claimed is:

1. A lithium metal secondary battery which comprises:
   an electrode assembly comprising a negative electrode, a positive electrode and a separator interposed between the negative electrode and the positive electrode;
   a non-aqueous electrolyte with which the electrode assembly is impregnated; and a battery casing in which the electrode assembly and the non-aqueous electrolyte are received, wherein the negative electrode comprises a negative electrode current collector and a lithium metal layer formed on at least one surface of the negative electrode current collector, the charge/discharge condition of the lithium metal secondary battery comprises charging the lithium metal secondary battery under a pressurized state and discharging the lithium metal secondary battery under a non-pressurized state.

2. The lithium metal secondary battery according to claim 1, wherein the pressure applied during charge is 3-150 psi.

3. The lithium metal secondary battery according to claim 2, wherein the pressure applied during charge is 40-100 psi.

4. The lithium metal secondary battery according to claim 1, wherein the pressure applied during discharge is 1-10 psi, when the lithium metal secondary battery is discharged under a pressurized state.

5. The lithium metal secondary battery according to claim 1, wherein a current density during charge is 0.01-4 mA/cm$^2$.

6. The lithium metal secondary battery according to claim 1, wherein a current density during charge is 0.05-3.5 mA/cm$^2$.

7. The lithium metal secondary battery according to claim 1, wherein a temperature during charge is 25-45° C.

8. The lithium metal secondary battery according to claim 1, which is charged at a temperature of 25-45° C. under a pressure of 40-100 psi with a charging current density of 0.05-3.5 mA/cm$^2$, and is discharged under a non-pressurized state or under a pressure of 1-10 psi.

9. The lithium metal secondary battery according to claim 1, which is a pouch-type lithium metal secondary battery.

10. A battery module comprising a plurality of unit cells and a module casing for receiving the unit cells, wherein the unit cell is the lithium metal secondary battery as defined in claim 1.

11. The battery module according to claim 10, wherein the lithium metal secondary battery is a pouch-type lithium metal secondary battery.

12. The battery module according to claim 10, wherein the module casing comprises a rubber material.

13. The battery module according to claim 10, wherein a portion of the module casing that is in contact with the large-area surface of the unit cell comprises a rubber material.

14. A battery pack comprising the battery module as defined in claim 10.

15. The lithium metal secondary battery according to claim 1, further comprising a charger to which a pressurization device is linked.

16. A method of operating a lithium metal secondary battery comprising:

an electrode assembly comprising a negative electrode, a positive electrode and a separator interposed between the negative electrode and the positive electrode;

a non-aqueous electrode with which the electrode assembly is impregnated; and a battery casing in which the electrode assembly and the non-aqueous electrolyte are received, the method comprising:

charging the lithium metal second battery under a pressurized state; and discharging the lithium metal second battery under a non-pressurized state.

17. The method according to claim 16, wherein the pressure applied during charge is 3-150 psi.

18. The method according to claim 16, wherein the current density during charge is 0.01-4 mA/cm$^2$.

19. The method according to claim 16, wherein a temperature during charge is 25-45° C.

* * * * *